United States Patent
Münzmay

(10) Patent No.: US 9,598,596 B2
(45) Date of Patent: Mar. 21, 2017

(54) AQUEOUS PREPARATIONS HAVING SOFT-FEEL PROPERTIES

(75) Inventors: Thomas Münzmay, Dormagen (DE); Alice Münzmay, legal representative, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 13/880,400

(22) PCT Filed: Oct. 17, 2011

(86) PCT No.: PCT/EP2011/068121
§ 371 (c)(1),
(2), (4) Date: Apr. 19, 2013

(87) PCT Pub. No.: WO2012/052406
PCT Pub. Date: Apr. 26, 2012

(65) Prior Publication Data
US 2013/0302624 A1 Nov. 14, 2013

(30) Foreign Application Priority Data
Oct. 19, 2010 (EP) .................. 10188086

(51) Int. Cl.
| C09D 133/14 | (2006.01) |
| C08G 18/08 | (2006.01) |
| C08G 18/70 | (2006.01) |
| C09D 175/06 | (2006.01) |
| C09D 133/06 | (2006.01) |
| C08F 220/18 | (2006.01) |

(52) U.S. Cl.
CPC ....... C09D 133/14 (2013.01); C08G 18/0823 (2013.01); C08G 18/0866 (2013.01); C08G 18/706 (2013.01); C09D 133/066 (2013.01); C09D 175/06 (2013.01); C08F 2220/1825 (2013.01); Y10T 428/31551 (2015.04)

(58) Field of Classification Search
CPC ............ C08G 18/0823; C08G 18/0866; C08G 18/706; C08F 2220/1825; C08F 2220/1858; C08F 2220/282; C08F 220/20; C08L 75/04; C09D 175/06; C09D 133/14; C09D 133/066; Y10T 428/31551
USPC ............. 428/423.1; 524/507; 427/385.5
See application file for complete search history.

(56) References Cited

U.S. PATENT DOCUMENTS

| 3,905,929 A | 9/1975 | Noll |
| 3,920,598 A | 11/1975 | Reiff et al. |
| 5,252,696 A | 10/1993 | Laas et al. |
| 5,284,928 A | 2/1994 | MuThomas et al. |
| 5,569,707 A | 10/1996 | Blum et al. |
| 6,426,414 B1 | 7/2002 | Laas et al. |
| 6,815,501 B2 * | 11/2004 | Flosbach et al. ............. 525/123 |
| 2003/0009047 A1 | 1/2003 | Tillack et al. |
| 2003/0105219 A1 | 6/2003 | Schutze et al. |
| 2004/0034162 A1 | 2/2004 | Laas et al. |
| 2004/0142115 A1 * | 7/2004 | Jaworek et al. ............. 427/508 |
| 2004/0230069 A1 | 11/2004 | Hofacker |
| 2005/0209399 A1 * | 9/2005 | Munzmay et al. ........... 524/589 |
| 2006/0058436 A1 * | 3/2006 | Kasler ......................... 524/261 |
| 2006/0079635 A1 | 4/2006 | Pohl et al. |
| 2006/0084775 A1 | 4/2006 | Rische et al. |
| 2006/0205857 A1 * | 9/2006 | Hofacker et al. ............. 524/457 |
| 2007/0059530 A1 | 3/2007 | Ziegler et al. |
| 2008/0090957 A1 | 4/2008 | Blum et al. |

FOREIGN PATENT DOCUMENTS

| CA | 2143026 A1 | 8/1995 |
| DE | 1595636 A1 | 8/1969 |
| DE | 2314512 A1 | 10/1974 |
| DE | 2314513 A1 | 10/1974 |
| DE | 4133572 A1 | 4/1993 |
| DE | 4406159 A1 | 8/1995 |
| DE | 10007821 A1 | 8/2001 |
| DE | 10024624 A1 | 11/2001 |
| EP | 0 540 985 A1 | 5/1993 |
| EP | 0669352 A1 | 8/1995 |
| EP | 0 959 087 A1 | 11/1999 |
| EP | 1404740 A2 | 4/2004 |
| EP | 1477508 A1 | 11/2004 |
| EP | 1647562 A1 | 4/2006 |
| EP | 1702954 A2 | 9/2006 |
| GB | 2218426 A | 11/1989 |
| WO | WO-02/090413 A1 | 11/2002 |

OTHER PUBLICATIONS

International Search Report for PCT/EP2011/068121 mailed Jan. 26, 2012.
International Preliminary Report on Patentability for PCT/EP2011/068121, mailing date May 2, 2013.

* cited by examiner

Primary Examiner — Thao T Tran
(74) Attorney, Agent, or Firm — Drinker Biddle & Reath LLP

(57) ABSTRACT

An aqueous preparation having soft-feel properties comprises: A) an aqueous polyurethane-polyurea dispersion, B) a hydroxy-functional polyacrylate copolymer dispersion and C) a polyisocyanate, which may have been hydrophilically modified. The copolymer dispersion B) further comprises a hydroxy-functional polycarbonate diol D) as a reactive diluent. The invention also concerns a process for producing coatings with such preparations, a substrate coated with such a preparation and the use of the preparation for the production of soft-feel coatings.

13 Claims, No Drawings

AQUEOUS PREPARATIONS HAVING SOFT-FEEL PROPERTIES

CROSS-REFERENCE TO RELATED APPLICATIONS

This application is a national stage application (under 35 U.S.C. §371) of PCT/EP2011/068121, filed Oct. 17, 2011, which claims benefit of European Application No. 10188086.2, filed Oct. 19, 2010, both of which are incorporated herein by reference in their entirety.

The present invention relates to an aqueous preparation having soft-feel properties which comprises: A) an aqueous polyurethane-polyurea dispersion, B) a hydroxy-functional polyacrylate copolymer dispersion and C) a polyisocyanate, which may have been hydrophilically modified. The invention also concerns a process for producing coatings with such preparations, a substrate coated with such a preparation and the use of the preparation for the production of soft-feel coatings.

Efforts to achieve a weight saving in automobiles have for years gone hand in hand with the increased deployment of plastic, not least in the interior. Aesthetic and technical requirements mean that plastic parts in the car are usually painted, in order to protect the plastic against external influences, such as sunlight and chemical, thermal and mechanical stress, to obtain particular colours and colour effects, to mask defects in the plastic's surface or to give the latter a pleasant feel (tactility).

In order to improve the tactile properties of plastic parts in the car interior, recent years have seen increasing use of what are called soft-feel paints. A "soft-feel" effect for the purposes of the present invention refers to a particular tactual sensation (tactility) on the part of the painted surface. This tactility can be described using terms such as velvety, soft, rubbery or warm, whereas, for example, the surface of a painted car body or a plastic plate such as ABS, Makrolon® (polycarbonate, Bayer AG) or plexiglass, for example, which is unpainted or has been painted with a conventional clearcoat or topcoat, feels cold and smooth.

Following the trend towards avoiding solvent emissions to the environment, aqueous soft-feel paints based on polyurethane chemistry, as disclosed by way of example in DE 44 06 159 A1 (EP 0 669 352 A1, CA 2143026), have become established over recent years. As well as an excellent soft-feel effect, these paints also produce coatings possessing good resistance and a protective effect for the plastic substrate.

Therein disclosed are aqueous dispersions of polyester-polyurethanes which contain hydroxyl groups and are prepared from:
a) 15 to 90% by weight of one or more essentially linear, polyester polyols,
b) 4 to 75% by weight of one or more essentially difunctional polyols selected from i) polycarbonates, ii) polyether polyols and iii) polyester polyols which are obtained by the hydrogenation of carboxyl groups to hydroxyl groups, the alkoxylation of carboxyl groups or the esterification of carboxyl groups using low molecular weight diols of dimeric fatty acids,
c) 1 to 10% by weight of one or more components containing acid groups selected from i) hydroxycarboxylic acids, ii) amino acids, iii) aminosulphonic acids and iv) alkali salts of the acids of i), ii) and iii),
d) 0 to 20% by weight of a low molecular weight component containing at least two hydroxyl and/or amino groups,
e) 0 to 20% by weight of one or more hydrophilic monovalent or divalent alcohols and
f) 5 to 50% by weight of a polyisocyanate component containing at least 50% by weight of linear aliphatic diisocyanates having a molecular weight of 168 to 300 g/mol,
wherein the sum of the percentages of components a) to f) is 100. Also disclosed are aqueous coating compositions containing as these polyester-polyurethanes as a binder component and compositions, in particular for the production of soft feel coatings, which combine a good soft feel effect, good film mechanics and surface bonding, and acceptable resistance to solvents.

Another example for soft-feel materials is given in EP 1 647 562 A1 which concerns an aqueous preparation with soft-feel characteristics comprising an aqueous polyurethane-polyurea material dispersion, hydroxy-functional, aqueous or water-dilutable binders, a polyisocyanate, which is optionally hydrophilically modified and a foam stabilizer.

It would be desirable to extend the class of suitable materials for soft-feel coatings. In this respect, it has been previously held that polyacrylate dispersions are not suitable as components for soft-feel coating compositions.

The present invention therefore has the object of providing aqueous soft-feel preparations which make use of alternative materials and which at the same time provides an adequate solvent resistance for the coatings obtained therefrom.

According to the invention this object is achieved by an aqueous preparation having soft-feel properties and comprising:
A) an aqueous polyurethane-polyurea dispersion,
B) a hydroxy-functional polyacrylate copolymer dispersion and
C) a polyisocyanate, which may have been hydrophilically modified,
wherein the copolymer dispersion B) further comprises a hydroxy-functional polycarbonate diol D) as a reactive diluent.

The inventors have realized that, surprisingly, the addition of hydroxy-functional polyacrylate copolymer dispersions with reactive diluents such as described in EP 1 702 954 A1 leads to the desired soft-feel coatings with solvent resistance.

Aqueous polyurethane-polyurea dispersions suitable as component A) are described for example in D. Dieterich in Houben-Weyl-Methoden der Organischen Chemie Volume E20: Polyurethane, pp. 1662-1666, pp. 1667-1670, 1672-1680, and also for example in DE-A 15 95 636, DE-A 25 61 506, DE-A 41 33 572 or WO-A 02/090413.

The polyacrylate copolymer dispersions B) may be prepared by free-radically polymerizing one or more monomer mixtures containing one or more OH-free (meth)acrylic esters and/or vinylaromatics, one or more hydroxy-functional (meth)acrylic esters, one or more ionic and/or potential ionic monomers capable of free-radical copolymerization, and optionally other monomers) that are capable of free-radical copolymerization in the presence of one or more hydroxy-functional polycarbonate polyols as reactive diluent D) and subsequently dispersing the resulting copolymers in water, before or after the addition of a neutralizing agent.

As component C) it is preferred to use polyisocyanates containing free isocyanate groups. Suitable polyisocyanates are those based for example on isophorone diisocyanate, hexamethylene diisocyanate, 1,4-diisocyanatocyclohexane, bis(4-isocyanatocyclohexane)methane or 1,3-diisocyanatobenzene or based on paint polyisocyanates such as polyisocyanates containing allophanate, uretdione, biuret or isocyanurate groups and derived from 1,6-diisocyanatohexane, isophorone diisocyanate or bis(4-isocyanatocyclohexane)methane, or paint polyisocyanates containing urethane groups and based on 2,4- and/or 2,6-diisocyanatotoluene or isophorone diisocyanate on the one hand and on low molecular weight polyhydroxyl compounds such as trimethylolpropane, the isomeric propanediols or butanediols or any desired mixtures of such polyhydroxyl compounds, on the other.

It is particularly preferred that the polyisocyanate C) comprises hexamethylene diisocyanate (HDI). Other preferred components C) are hydrophobic or hydrophilicized polyisocyanates of low viscosity, containing free isocyanate groups based on aliphatic, cycloaliphatic, araliphatic and/or aromatic isocyanates; particular preference is given to aliphatic or cycloaliphatic isocyanates. These polyisocyanates have at 23° C. in general a viscosity of 10 to 3500 mPas. If necessary the polyisocyanates can be employed as a blend with small amounts of inert solvents, in order to lower the viscosity to a level within the aforesaid range. Triisocyanatononane as well can be used, alone or in mixtures, as a crosslinker component. Water-soluble and/or dispersible polyisocyanates are obtainable for example by modification with carboxylate, sulphonate and/or polyethylene oxide groups and/or polyethylene oxide/polypropylene oxide groups.

To render the polyisocyanates C) hydrophilic it is particularly preferred to react them with substoichiometric amounts of monohydric, hydrophilic polyether alcohols. The preparation of hydrophilicized polyisocyanates of this kind is described for example in EP-A 0 540 985. Likewise of particular preference are also the polyisocyanates described in EP-A 959087 that contain allophanate groups, these polyisocyanates being prepared by reacting low-monomer-content polyisocyanates with polyethylene oxide polyether alcohols under allophanatization conditions. Suitable as well are the water-dispersible polyisocyanate mixtures based on triisocyanatononane that are described in DE-A 100 078 21, and also polyisocyanates hydrophilicized with ionic groups (sulphonate groups, phosphonate groups), as described, for example, in DE-A 100 24 624. Hydrophilicization by the addition of commercially customary emulsifiers is a further possibility.

It will be appreciated that it is also possible to use component C) in the form of what are known as blocked polyisocyanates. The blocking of the abovementioned polyisocyanates having free isocyanate groups takes place in accordance with known prior art by reaction of the polyisocyanates having free isocyanate groups with suitable blocking agents. Suitable blocking agents for these polyisocyanates are, for example, monohydric alcohols such as methanol, ethanol, butanol, hexanol, cyclohexanol, benzyl alcohol, oximes such as acetoxime, methyl ethyl ketoxime, cyclohexanone oxime, lactams such as .epsilon.-caprolactom, phenols, amines such as diisopropylamine or dibutylamine, dimethylpyrazole or triazole, and dimethyl malonate, diethyl malonate or dibutyl malonate.

In order to achieve specific effects it may also be advantageous to use flexibilized polyisocyanate components C), which are easily obtained by prepolymerizing the abovementioned polyisocyanate components with preferably di- to trifunctional polyol components, more preferably difunctional polyol components as already specified under synthesis components a1).

Although the components A) and B) of the invention are generally sufficiently hydrophilic, so that the dispersibility of component C) is ensured, it is in many cases possible, by using hydrophilically modified polyisocyanates as component C), to obtain an improvement in the liquor stability and the optical and tactile properties of the soft-feel paints. It is therefore possible to use hydrophilically modified polyisocyanates as component C), preference being given in this context to polyisocyanates modified with sulphonate groups, as described for example in DE-A 100 24 624. Also possible in principle, of course, is the use of mixtures of different crosslinker resins.

Suitable hydroxy-functional polycarbonate polyols D) may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and/or mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

Polycarbonate polyols D) are preferably prepared by the preparation method described in EP 1 404 740 B1 (pp. 6-8, Examples 1-6) and EP 1 477 508 A1 (p. 5, Example 3).

The present invention will be described in connection with preferred embodiments which may be combined freely unless the context clearly indicates otherwise.

In an embodiment of the preparation according to the invention the copolymer dispersion B) comprises one or more hydroxy-functional copolymers synthesized from a) one or more OH-free (meth)acrylic esters and/or vinylaromatics, b) one or more hydroxy-functional (meth)acrylic esters, c) one or more ionic and/or potential ionic monomers capable of free-radical copolymerization, and d) optionally one or more monomers other than components a) to c) that are capable of free-radical copolymerization.

Monomers of component a) that are used are acrylates and methacrylates (referred to below as (meth)acrylates) having 1 to 18 carbon atoms in the alcohol moiety of the ester group. This alcohol moiety may be linear aliphatic, branched aliphatic or cycloaliphatic.

Suitable monomers a) include methyl, ethyl, n-propyl, n-butyl, isopropyl, isobutyl, t-butyl, the isomeric pentyls, hexyls, 2-ethylhexyls, octyls, dodecyls, hexadecyls, octadecyls or cyclohexyls, trimethylcyclohexyl, and isobornyl (meth)acrylates or acetoacetoxyethyl methacrylate. Suitable vinyl aromatics include, in particular, styrene, substituted styrenes, and vinyltoluenes. Also suitable as component a) are mixtures of the preceding compounds.

Suitable as component b) are ethylenically unsaturated, OH-containing monomers, such as hydroxyalkyl esters of unsaturated carboxylic acids, preferably hydroxyalkyl (meth)acrylates having 2 to 12, preferably 2 to 6, carbon atoms in the hyroxyalkyl radical. Examples include 2-hydroxyethyl(meth)acrylate, the isomeric hydroxypropyl (meth)acrylates, 2-, 3-, and 4-hydroxybutyl(meth)acrylates, and the isomeric hydroxyhexyl(meth)acrylates.

Ionic and/or potential ionic monomers c) are these capable of free-radical polymerization and include olefinically unsaturated monomers having carboxylic acid or carboxylic anhydride groups. Examples include acrylic acid, methacrylic acid, β-carboxyethyl acrylate, crotonic acid, fumaric acid, maleic anhydride, itaconic acid or monoalkyl esters of dibasic acids and/or anhydrides such as monoalkyl maleates, preference being given to acrylic acid and/or methacrylic acid.

Other suitable monomers c) are unsaturated, free-radically polymerizable compounds having phosphate, phosphonate, sulphonic acid or sulphonate groups, as described for example in WO-A 00/39181 (p. 8, l. 13-p. 9, l. 19), preference being given to 2-acrylamido-2-methylpropanesulphonic acid.

It is also possible to use other monomers capable of free-radical copolymerization as component d). Examples include derivatives of acrylic or methacrylic acid such as acylamide, methacrylamide, acrylonitrile, and methacrylonitrile; vinyl ethers; and vinyl acetates. Other suitable monomers d) include (meth)acrylate monomers and/or vinyl monomers having a functionality of two or more, such as hexanediol di(meth)acrylate or divinylbenzene. Also suitable as monomers d) are polymerizable hydroxy-functional monomers, modified with alkylene oxides or chain-extended and having a number average molecular weight ≤3000 g/mol, preferably ≤500 g/mol. Alkylene oxides employed for this purpose are preferably ethylene, propylene or butylene oxide, and may be sued individually or in mixtures.

Other monomers d) include vinyl esters, for example, of the Versatic acids, which are available commercially under the name VEOVA® 9, 10, and 11 (from Resolution Performance Products). They are vinyl esters having a highly branched structure with branched alkyl groups containing together 6, 7 or 8 carbon atoms. These acids correspond to VEOVA® 9, 10, and 11 acids.

The glass transition temperatures (Tg) of the homopolymers of the VEOVA series are reported to be 70° C. (VEOVA 9), −3° C. (VEOVA 10), and −40° C. (VEOVA 11).

Other monomers d) include alkoxypolyethylene glycol or alkoxypropylene glycol (meth)acrylic esters, such as those obtained by esterification of acrylic or methacrylic with ethylene oxide polyethers or propylene oxide polyethers prepared starting from monofunctional alcohols such as methanol, ethanol, (iso)propanol or one of the isomers of butanol. Preference is given to alkoxypolyethylene glycol (meth)acrylic acid esters.

The procedure for the polymerization of the unsaturated monomers is known and involves introducing reactive diluent D) into a reaction vessel, as an initial charge, and polymerizing the unsaturated monomers using a free-radical initiator. The copolymerization is preferably carried out in general at 40 to 200° C., more preferably at 60 to 180° C., and most preferably at 80 to 160° C.

Optionally, it is possible for organic solvents to be employed in minor amounts. Suitable solvents include those known from coatings technology, such as alcohols, ethers, alcohols containing ether groups, esters, ketones, apolar hydrocarbons, or mixtures of these solvents. The solvents are used in amounts such that their amount in the finished dispersion is 0 to 5% by weight. If necessary, the solvents used can be partially removed again by distillation.

Examples of suitable initiators for the polymerization reaction include organic peroxides (such as di-tert-butyl peroxide or tert-butyl peroxy-2-ethylhexanoate) and azo compounds (such as azodiisobutyronitrile (AIBN)). The amounts of initiator used depend on the desired molecular weight. For reasons of operational reliability and greater ease of handling it is also possible to use peroxide initiators as a solution in suitable organic solvents of the type mentioned above.

In one preferred embodiment of the process there is a two-stage addition and polymerization of unsaturated monomers in the presence of component D). In this embodiment in a first step (I) a hydroxy-functional copolymer having an OH number of 12 to 200, preferably 15 to 190, and more preferably 100 to 165 mg KOH/g solids and an acid number of 0 to 50, preferably 0 to 20, and more preferably 0 to 15 mg KOH/g solids is prepared from 55 to 90% by weight of component a), 2.5 to 50% by weight of component b), 0 to 6.5% by weight of component c), and 0 to 42.5% by weight of component d).

In a subsequent step (II) another polymer is prepared in the reaction mixture obtained from step (I) from monomers a)-d). This polymer has an OH number of 20 to 200, preferably 20 to 190, and more preferably 50 to 165 mg KOH/g solids and an acid number of 50 to 200, preferably 75 to 185, and more preferably 77 to 150 mg KOH/g solids. The polymer from step (II) is prepared from 45% to 80% by weight of component a), 5% to 50% by weight of component b), 6.5 to 25% by weight of component c) and 0 to 43.5% by weight of component d).

In both steps the % data of the polymer compositions add up to 100% by weight per polymer. The monomer amounts of the two polymer preparations are chosen such that the weight ratio of the polymer from step (I) to the polymer from step (II) amounts to 10:1 to 1:2, preferably 6:1 to 2:1.

The amounts of synthesis components a) to d) are preferably selected such that the copolymer has an OH number of 12.5 to 200 mg KOH/g, preferably of 15 to 190 mg KOH/g and more preferably of 95 to 165 mg KOH/g solids and an acid number of 4.5 to 150 mg KOH/g, preferably 7 to 75 mg KOH/g, and more preferably of 10 to 60 mg KOH/g solids. The resulting polymer from steps (I) and (II) is prepared from 54% to 83% by weight, preferably 53.5% to 87% by weight, of component a); 2.5% to 50% by weight, preferably 3% to 50% by weight, of component b); 0.6% to 19%, preferably 1% to 12.5% by weight, of component c); and 0 to 43.5%, preferably 0 to 43% by weight, of component d).

Instead of a multistage polymerization process it is possible to carry out the operation continuously (gradient polymerization) by adding a monomer mixture with a composition which changes in accordance with the composition of the copolymer or copolymers A). The hydrophilic monomer fractions of components c) and optionally d) are preferably higher towards the end of the feed than at the beginning.

The copolymers obtainable by the process of the invention have number average molecular weights, Mn of 500 to 30,000 g/mol, preferably 1000 to 15,000 g/mol, and more preferably 1500 to 10,000 g/mol.

Before, during or after dispersing the hydroxy-functional copolymers in water at least a portion of the acid groups present are converted into their salt form by adding suitable neutralizing agents. Suitable neutralizing agents include organic amines or water-soluble inorganic bases, such as soluble metal hydroxides, metal carbonates or metal hydrogen carbonates. Examples of suitable amines include N-methylmorpholine, triethylamine, ethyldiisopropylamine, N,N-dimethylethanolamine, N,N-dimethylisopropanolamine, N-methyldiethanolamine, diethylethanolamine, triethanolamine, butanolamine, morpholine, 2-aminomethyl-2-methylpropanol or isophorone diamine. In mixtures it is also possible, proportionally, to use ammonia. Particular preference is given to triethanolamine, N,N-dimethylethanolamine and ethyldiisopropylamine.

The neutralizing agents are added in amounts such that there is a theoretical degree of neutralization of the acid groups of 40% to 150%, preferably 60% to 120%. The degree of neutralization is understood to be the ratio between the added basic groups of the neutralizing component and the acid functions of the copolymer. The pH of the aqueous binder dispersion of the invention is 6 to 10, preferably 6.5 to 9.

The aqueous copolymer dispersions may have a solids content of 25% to 70% by weight, preferably 35% to 60% by weight, and more preferably of 40% to 55% by weight, and an organic solvent content of 0 to 5% by weight, preferably 0.5% to 3.5% by weight.

In another embodiment of the preparation according to the invention the hydroxy-functional polycarbonate polyol D) has an average hydroxyl functionality of ≥1.6 to ≤6 and a number average molecular weight of ≥240 g/mol to ≤5000 g/mol. Preferably the functionality is ≥1.8 to ≤3 and more preferably ≥1.9 to ≤2.3. Furthermore, it is preferred that the number average molecular weight is ≥500 g/mol to ≤3000 g/mol and more preferably ≥700 g/mol to ≤1500 g/mol.

In another embodiment of the preparation according to the invention the hydroxy-functional polycarbonate polyol D) is prepared from 1,4-butane diol, 1,6-hexane diol, 3-methyl-1,5-pentane diol or mixtures thereof.

In another embodiment of the preparation according to the invention the hydroxy-functional polycarbonate polyol D) is prepared from 1,6-hexane diol and ε-caprolactone.

In another embodiment of the preparation according to the invention the hydroxy-functional polycarbonate polyol D) has an average hydroxyl functionality of ≥1.9 to ≤2.05.

In another embodiment of the preparation according to the invention the polycarbonate polyol D) is present in an amount of ≥40 weight-% to ≤80 weight-% with respect to the solid content of the copolymer dispersion B). Preferably, this amount is from ≥50 weight-% to ≤70 weight-%.

In another embodiment of the preparation according to the invention the copolymer dispersion is prepared from 2-ethyl hexyl acrylate, hydroxypropyl methacrylate, hydroxyethyl acrylate, butyl acrylate, butyl methacrylate, isobornyl methacrylate, styrene, methyl methacrylate, acrylic acid or mixtures thereof.

In another embodiment of the preparation according to the invention component A) comprises units selected from the following groups:
a1) polyester, polyesteramide, polycarbonate, polyacetal and polyether polyols having molecular weights of ≥300 g/mol, which contain at least two free hydroxyl groups and are capable of reaction with isocyanate groups,
a2) diols of the molecular weight range ≥62 g/mol to ≤299 g/mol, a3) nonionic hydrophilicizer based on a copolymer of ethylene oxide and propylene oxide,
a4) di- or polyisocyanates,
a5) aliphatic and/or alicyclic primary and/or secondary polyamines and
a6) isocyanate-reactive, ionically or potentially ionically hydrophilicizing compounds.

Suitable polyol components a1) include in particular linear polyester diols or else polyester polyols with a low degree of branching, such as may be prepared conventionally from aliphatic, cycloaliphatic and aromatic di- or polycarboxylic acids and/or their anhydrides. Preferred units are, for example, adipic, decanedicarboxylic, terephthalic, isophthalic, o-phthalic, tetrahydrophthalic, hexahydrophthalic and acid anhydrides, such as o-phthalic anhydride or a mixture thereof, and polyhydric alcohols, such as ethanediol, di-, tri-, tetraethylene glycol, 1,2-propanediol, di-, tri-, tetrapropylene glycol, butane-1,4-diol, hexane-1,6-diol, 2,2-dimethyl-1,3-propanediol, 1,4-dimethylolcyclohexane or mixtures thereof, with or without the use of polyols of higher functionality, such as trimethylolpropane or glycerol. Suitable polyhydric alcohols for preparing the polyester polyols a1) naturally also include cycloaliphatic and/or aromatic di- and polyhydroxyl compounds. In lieu of the free polycarboxylic acid it is also possible to use the corresponding polycarboxylic anhydrides or corresponding polycarboxylic esters of lower alcohols or mixtures thereof for preparing the polyesters a1).

Suitable polyol components also include homopolymers or copolymers of lactones, which are obtained preferably by addition reaction of lactones or lactone mixtures, such as butyrolactone, s-caprolactone and/or methyl-ε-caprolactone, with suitable difunctional and/or higher polyfunctional starter molecules, such as low molecular weight polyhydric alcohols, for example. Preference is given to a copolymer of hexane-1,6-diol, ε-caprolactone with diphenyl and/or dialkyl carbonates.

Hydroxyl-containing polycarbonates are also suitable as polyol components a1), examples being those which can be prepared by reacting diols such as 1,4-butanediol and/or 1,6-hexanediol with diaryl carbonates, e.g. diphenyl carbonate, dialkyl carbonate, such as dimethyl carbonate, or phosgene, with a molecular weight of 800 to 5000 g/mol.

Suitable polyol components a1) are, furthermore, polyether polyols such as polytetramethylene glycols, for example, which are used preferably in combination with the polycarbonate polyols.

Optionally it is also possible to use diols of the molecular weight range 62 to 299 g/mol as units, although this is not preferred. Preferred synthesis components a2) are 1,2-ethanediol, 1,4-butanediol, 1,6-hexanediol and 2,2-dimethylpropane-1,3-diol. 1,4-Butanediol and 1,6-hexanediol are particularly preferred.

It is optionally possible for component A) to have a nonionic hydrophilicization. For that purpose it is preferred as synthesis components a3) to use the copolymers of ethylene oxide with propylene oxide that have an ethylene oxide mass fraction of more than 50%, with particular preference of 55% to 89%.

The monofunctional hydrophilic synthesis components are prepared in a similar way to that described in DE-A 23 14 512 or DE-A 23 14 513 or in U.S. Pat. No. 3,905,929 or U.S. Pat. No. 3,920,598, by alkoxylating a monofunctional starter such as n-butanol or N-methylbutylamine, for example, using ethylene oxide and optionally a further alkylene oxide such as propylene oxide, for example.

In one particularly preferred embodiment use is made as synthesis components a3) of compounds having a molecular weight of at least 400 g/mol, preferably of at least 500 g/mol and more preferably of 1200 to 4500 g/mol.

Suitable synthesis components a4) for the aqueous polyurethane-polyurea dispersions that are preferred as component A) include any desired organic compounds which have at least two free isocyanate groups per molecule, such as diisocyanates $X(NCO)_2$, for example, where X is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Further examples of compounds which can be used as a diisocyanate component are described for example by W. Siefken in Justus Liebigs Annalen der Chemie, 562, pp. 75-136.

Examples of diisocyanates to be used with preference are 1,6-diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, 1,3- and 1,4-bis(2-isocyanatoprop-2-yl)benzene (TMXDI) or any desired mixtures of such diisocyanates.

It will be appreciated that it is also possible (additionally) to use, proportionally, the polyisocyanates of higher functionality that are known per se in polyurethane chemistry or else modified polyisocyanates that are known per se, containing for example carbodiimide groups, allophanate groups, isocyanurate groups, urethane groups and/or biuret groups.

Examples of preferred synthesis components a5) include 1,2-ethanediamine, 1-amino-3,3,5-trimethyl-5-aminomethylcyclohexane (isophoronediamine), piperazine or diethylenetriamine and also hydrazine or hydrazine hydrate.

Based on solids, the aqueous polyurethane-polyurea dispersions A) have an anionic groups content of 1 to 30, preferably of 1 to 20, more preferably of 2 to 13.5 mmol per 100 g of polyurethane-polyurea resin. Ionic groups of this kind are successfully incorporated conventionally through the additional use of synthesis components a6), which in addition to at least one, preferably two isocyanate-reactive groups such as alcohol or amine functions, for example, contain an anionic or potentially anionic group. Examples of suitable synthesis components a6) are dihydroxyalkanecarboxylic acids such as dimethylolpropanoic acid or dimethylolbutyric acid, and also diols which additionally contain 0.5 to 2 mol of sulphonic acid groups or sulphonate groups per molecule, such as polyethersulphonates, for example.

Preferred compounds a6) are, moreover, diamines or polyamines containing, for example, alkali metal sulphonate groups, particular preference being given to the alkali metal salts of N-(2-aminoethyl)-2-aminoethanesulphonic acid. The sodium salt is preferred.

Where synthesis component a6) is used in the form of free acids, these acids must be converted into their ionic form by adding suitable neutralizing agents before the polymer melt is transferred to water. Examples of suitable neutralizing agents include tertiary amines or inorganic bases; the counterion is the sodium ion.

It is usual to use 20% to 94.5%, preferably 30% to 80% and more preferably 50% to 76.5% by weight of component a1), 0 to 30%, preferably 0 to 15% by weight of component a2), 0 to 10%, preferably 0.5% to 6% by weight of component a3), 4.5% to 50%, preferably 5% to 30% and more preferably 7.5% to 20% by weight of component a4), 0.5% to 13%, preferably 1% to 5% by weight of component a5) and 0.5% to 8%, preferably 1.5% to 5.5% by weight of component a6), with the proviso that the sum of the components makes 100% by weight.

The aqueous polyurethane-polyurea dispersion that is suitable as synthesis components A) is prepared preferably by the acetone process (D. Dieterich in Houben-Weyl: Methoden der Organischen Chemie, Volume E20, pp. 1670-81 (1987)).

In the acetone process the synthesis of the polyurethane-polyurea resins forming the basis in the aqueous dispersions A) takes place in a multi-stage operation.

In a first stage a prepolymer containing isocyanate groups is synthesized from the synthesis components a1) to a4) and optionally a6). The amounts in which the individual components are employed are such as to result in an isocyanate index of 1.1 to 3.5, preferably of 1.3 to 2. The isocyanate content of the prepolymers is between 1.5% and 7.5%, preferably between 2% and 4.5% and more preferably between 2.5% and 3.5%. Furthermore, when determining the amount of the synthesis components a1) to a4) and optionally a6), it should be ensured that the arithmetic, number-average functionality lies between 1.80 and 3.50, preferably between 1.95 and 2.25.

In a second stage the prepolymer prepared in stage 1 is dissolved in an organic, at least partly water-miscible solvent which carries no isocyanate-reactive groups. A preferred solvent is acetone. The amounts of solvent to be used should be such as to result in a solids content of 20% to 80%, preferably of 30% to 50%, more preferably of 35% to 45% by weight.

In a third stage the isocyanate-containing prepolymer solution is reacted with mixtures of the amino-functional synthesis components a5) and a6), insofar as the synthesis components a6) are amino-functional compounds, with chain extension to form the high molecular weight polyurethane-polyurea resin. The amounts of the synthesis components are such that for each mole of isocyanate groups of the dissolved prepolymer there results 0.3 to 0.93 mol, preferably 0.5 to 0.85 mol, of primary and/or secondary amino groups of the synthesis components a5) to a6). The arithmetic, number-average isocyanate functionality of the resultant polyurethane-polyurea resin amounts to between 1.55 and 3.10, preferably between 1.90 and 2.35. The arithmetic, number-average molecular weight (Mn) amounts to between 4500 and 250 000 g/mol, preferably between 10 000 and 80 000 g/mol.

In a fourth stage the high molecular weight polyurethane-polyurea resin is precipitated in the form of a fine dispersion by addition of water to the solution.

Free acid groups incorporated are optionally neutralized between the third and fourth steps.

In a fifth stage some or all of the organic solvent is distilled off, optionally under reduced pressure. The amount of water in stage 4 is determined such that the aqueous polyurethane-polyurea dispersion has a solids content of 30% to 70%, preferably of 40% to 65% by weight.

The present invention is also concerned with a process for producing coatings which comprises applying a coating composition comprising the preparation of the invention to a substrate and subsequently curing the coating composition to form a coating.

Suitable substrates for the coatings are generally any desired usual, hard or stretchable and/or flexible substrates. Examples of hard substrates which can be mentioned include stone and stone-like materials, metal and wood. Flexible and/or tough, stretchable substrates used may be, for example, thermoplastic and/or thermoset polymers such as in the car interior or in industrial applications.

Application can take place very easily using methods that are customary per se such as doctor blading or coating with a roller, for example, or primarily by spraying with suitable spray guns, examples being those with or without an air supply, e.g. with so-called airless or air-mix spray guns or, preferably, with low-pressure guns (HVLP—high volume low pressure—guns). Particular suitability is possessed by application by spraying or using a roller coater. The composition can also be applied to the substrates by pouring and dipping.

The composition can also be applied to foils and subjected to three-dimensional deformation in a damage-free thermoforming operation without loss of adhesion, stress whitening or optical or tactile alteration.

Another aspect of the present invention is a substrate coated with the preparation of the invention.

It is preferred that the substrate is a flexible and/or stretchable substrate made of thermoplastic and/or thermoset polymers.

The invention also encompasses the use of a preparation of the invention for the production of soft-feel coatings. Preferably, the soft-feel coatings are automobile interior coatings.

The present invention will be further described with reference to the following examples without wishing to be limited by them.

GLOSSARY

Peroxan DB: Di-tert.-butyl peroxide (Pergan)
HPMA: Hydroxypropyl methacrylate
MPEG 350 MA: Methoxypolyethylene glycol methacrylate, approx. 8 EO units in the chain.
Tone M 100: poly($\epsilon$-caprolactone) monoacrylate (Dow Chemical)
DNE 01: Defoamer; Blend of fatty acid esters and higher-rated hydrocarbons with carboxylic acid salts (Tanatex)
BYK 348: Silicone surfactant (BYK)
Tegowet KL 245: Polyether siloxane copolymer (Evonik)
Aquacer 535: non ionic emulsion of a modified paraffin wax (BYK)
Sillitin Z 86: agglomerate of corpuscular quartz and lamellar kaolinite (Hoffmann Mineral)
Talkum IT extra: talc (Norwegian Talc)
Bayferrox 318 M: synthetic $Fe_3O_4$ pigment (Lanxess)
OK 412: silicon dioxide matting agent (Evonik)
Bayhydur VP LS 2306: hydrophilic aliphatic polyisocyanate based on hexamethylene diisocyanate (Bayer MaterialScience)
Bayhydrol PT 355: aliphatic, hydroxyfunctional polyester polyurethane dispersion (Bayer MaterialScience)
Desmophen XP 2501: polycarbonate polyol based on 1-6-hexane diol and $\epsilon$-caprolactone (Bayer MaterialScience)
DMEA: N,N-dimethylethanolamine
PnB: Propylene glycol n-butyl ether
Bayblend T65: Polycarbonate+ABS blend Solids Content:

The solids content was determined in a drying cabinet and calculated as follows: final weight [g]*100/initial weight [g]=wt. % solids Viscosity (23° C.): Viscosity measurements were conducted in a cone and plate viscometer in accordance with DIN 53019 at a shear rate of 40 $s^{-1}$.

Acid Number:

The acid number was determined according to DIN 3682.

pH: The pH was measured according to international standard ISO 976.

Example Group 1 hydroxyfunctional polyacrylate dispersions without reactive thinner Percentages given are weight-%, unless indicated otherwise by the context.

|  | Example Nr. | | | | |
| --- | --- | --- | --- | --- | --- |
|  | PAC 1-1 | PAC 1-2 | PAC 1-3 | PAC 1-4 | PAC 1-5 |
| Part 1 | | | | | |
| Peroxan DB | 0.32% | 0.32% | 0.32% | 0.32% | 0.32% |
| Part 2 | | | | | |
| 2-Ethylhexyl acrylate | 9.05% | 15.00% | 10.00% | 10.00% | 9.06% |
| HPMA | 26.80% | 20.80% | 20.80% | 20.80% | 16.70% |
| Butyl acrylate | 21.61% | 28.89% | 23.89% | 24.50% | 21.65% |
| Butyl methacrylate | 17.18% | 19.00% | 19.00% | 19.00% | 17.22% |
| Ethyldiglycol acrylate | 9.05% | — | — | 10.00% | 9.06% |
| MPEG 350 MA | — | — | 10.00% | — | — |
| Tone M 100 | — | — | — | — | 10.00% |
| Part 3 | | | | | |
| Peroxan DB | 1.37% | 1.37% | 1.37% | 0.76% | 1.37% |
| Part 4 | | | | | |
| HPMA | 7.20% | 7.20% | 7.20% | 7.20% | 7.20% |
| Butyl acrylate | 4.10% | 4.10% | 4.10% | 4.10% | 4.10% |
| Acrylic acid | 3.00% | 3.00% | 3.00% | 3.00% | 3.00% |
| Part 5 | | | | | |
| Peroxan DB | 0.32% | 0.32% | 0.32% | 0.32% | 0.32% |
| Solid resin | 100.00% | 100.00% | 100.00% | 100.00% | 100.00% |
| Data | | | | | |
| Solids content | 43.10% | 48.30% | 42.70% | 45.50% | 45.20% |
| Co-solvent | PnB | PnB | PnB | PnB | PnB |
| Amount (as supplied) | 7.60% | 8.50% | 7.50% | 8.00% | 8.00% |
| Acid number (100%) | 25.6 | 25.2 | 25.3 | 26.0 | 25.5 |
| OH content (100%) | 4.00% | 3.30% | 3.30% | 3.30% | 3.30% |
| Amine type | DMEA | DMEA | DMEA | DMEA | DMEA |
| Neutralization degree | 105% | 105% | 105% | 105% | 105% |
| Viscosity 23° C. [mPa · s] | 2600 | 2350 | 6800 | 2520 | 2860 |
| pH (10%) | 8.5 | 8.6 | 8.5 | 8.6 | 8.7 |
| Mean particle size | 72 nm | 141 nm | 48 nm | 100 nm | 96 nm |

Example Group 2

Composition of soft-feel coatings. All amounts given are in grams.

|  | Example Nr. | | | | | |
|---|---|---|---|---|---|---|
|  | C 2-1 | C 2-2 | C 2-3 | C 2-4 | C 2-5 | C 2-6 |
| Bayhydrol PT 355 | 100 | — | — | — | — | — |
| PAC 1-1 | — | 100 | — | — | — | — |
| PAC 1-2 | — | — | 100 | — | — | — |
| PAC 1-3 | — | — | — | 100 | — | — |
| PAC 1-4 | — | — | — | — | 100 | — |
| PAC 1-5 | — | — | — | — | — | 100 |
| Demin. Water | 98.0 | 78.3 | 79.5 | 70.0 | 88.2 | 70.0 |
| DNE 01 (as supplied) | 0.6 | 0.7 | 0.7 | 0.6 | 0.7 | 0.7 |
| BYK 348 (as supplied) | 1.1 | 1.5 | 1.5 | 1.3 | 1.4 | 1.4 |
| Tegowet KL 245 (50% in water) | 0.8 | 1.1 | 1.1 | 1.0 | 1.0 | 1.0 |
| Aquacer 535 (as supplied) | 4.1 | 5.4 | 5.4 | 4.7 | 5.1 | 5.0 |
| Sillitin Z 86 | 13.8 | 18.3 | 18.4 | 16.1 | 17.2 | 17.2 |
| Talkum IT extra | 11.0 | 14.6 | 14.7 | 12.9 | 13.8 | 13.8 |
| Bayferrox 318 M | 36.8 | 48.7 | 49.0 | 43.0 | 46.0 | 45.9 |
| OK 412 | 7.4 | 9.7 | 9.8 | 8.6 | 9.2 | 9.2 |
| Bayhydur VP LS 2306 | 49.4 | 105.0 | 98.8 | 86.5 | 92.6 | 92.6 |

Example Group 3 haptic testing on Bayblend T65 as a substrate

| Coating | Binder | Haptics |
|---|---|---|
| C 2-1 | Bayhydrol PT 355 | 3 (strongly rubber-like, very strongly blocking) |
| C 2-2 | PAC 1-1 | 1 (velvety, smooth, soft) |
| C 2-3 | PAC 1-2 | 1 (velvety, smooth, soft) |
| C 2-4 | PAC 1-3 | 1 (velvety, smooth, soft) |
| C 2-5 | PAC 1-4 | 1 (velvety, smooth) |
| C 2-6 | PAC 1-5 | 1 (velvety, smooth) |

The haptic testing was performed by an experienced technician and assessed according to a numerical scale from 1 to 3, wherein 1 denotes the most desired soft-feel effect and 3 no soft-feel effect.

Example Group 4 solvent resistance on glass

| Coating | Binder | EtOAc | MPA | Xylene | EtOH | SB | H$_2$O |
|---|---|---|---|---|---|---|---|
| C 2-1 | Bayhydrol PT 355 | 5 | 4 | 4 | 4 | 4 | 3 |
| C 2-2 | PAC 1-1 | 4 | 3 | 3 | 3 | 3 | 2 |
| C 2-3 | PAC 1-2 | 4 | 3 | 3 | 3 | 3 | 3 |
| C 2-4 | PAC 1-3 | 4 | 3 | 3 | 4 | 3 | 3 |
| C 2-5 | PAC 1-4 | 4 | 3 | 4 | 3 | 4 | 2 |
| C 2-6 | PAC 1-5 | 4 | 3 | 3 | 3 | 3 | 2 |

(EtOAc: ethyl acetate, MPA: methoxypropyl acetate, EtOH: ethanol, SB: gasoline)

The solvent resistance was tested according to the following protocol:
The results are denoted as follows:
0: unchanged, no damage
1: trace is changed (swelling ring is weakly visible, only by reflection of light; swelling ring is clearly visible, no softening with fingernail)
2: slightly changed (swelling ring is visible in light, scratch marks by finger nail visible)
3: visibly changed (closed swelling ring is clearly visible, scratch marks visible, softening by fingernail)
4: strongly changed (closed swelling ring is very strongly visible, can be scratched through to the underlying base surface)
5: destroyed (coating surface destroyed without any further action)

Result:
coatings based on the polyacrylate dispersions show a good to very good haptic performance and at the same time a better solvent resistance than the standard system on the basis of a polyester polyurethane dispersion (Bayhydrol PT 355).

Example Group 5 hydroxyfunctional polyacrylate dispersions with reactive thinner Desmophen XP 2501. Percentages given are weight-%, unless indicated otherwise by the context.

|  | Example Nr. | | |
|---|---|---|---|
|  | PAC 5-1 | PAC 5-2 | PAC 5-3 |
| Desmophen XP 2501 Part 1 | 20.00% | 20.00% | 60.00% |
| Peroxan DB Part 2 | 0.26% | 0.26% | 0.13% |
| 2-Ethylhexyl acrylate | 1.00% | 10.00% | 1.36% |
| HPMA | 18.00% | 18.00% | — |
| Hydroxyethyl acrylate | — | — | 9.44% |
| Butyl acrylate | 27.60% | 30.18% | — |
| Butyl methacrylate | 4.00% | 6.08% | 7.25% |
| Isobornyl methacrylate | 1.00% | — | 11.54% |
| Styrene Part 3 | — | — | 2.25% |
| Peroxan DB Part 4 | 0.92% | 0.92% | 0.46% |
| Methyl methacrylate | — | — | 2.04% |
| HPMA | 5.76% | 5.76% | — |
| Hydroxyethyl acrylate | — | — | 2.88% |
| Butyl acrylate | 3.20% | 6.62% | 1.60% |
| Acrylic acid Part 5 | 2.00% | 1.92% | 0.92% |
| Peroxan DB | 0.26% | 0.26% | 0.13% |
| Solid resin | 100.00% | 100.00% | 100.00% |
| Data |  |  |  |
| Solids content | 52.00% | 48.60% | 64.00% |
| Co-solvent | PnB | PnB | PnB |
| Amount (as supplied) | 1.20% | 1.40% | 1.40% |
| Acid number (100%) | 17.5 | 18.3 | 7.8 |
| OH content (100%) | 3.50% | 3.50% | 3.80% |
| Amine type | DMEA | DMEA | DMEA |
| Neutralization degree | 105% | 105% | 105% |
| Viscosity 23° C. [mPa · s] | 2120 | 1470 | 2010 |
| pH (10%) | 8.4 | 8.8 | 8.5 |
| Mean particle size | 101 nm | 88 nm | 222 nm |

Example Group 6

Composition of soft-feel coatings. All amounts given are in grams.

|  | Example Nr. | | | |
|---|---|---|---|---|
|  | C 6-1 | C 6-2 | C 6-3 | C 6-4 |
| Bayhydrol PT 355 | 100 | — | — | — |
| PAC 5-1 | — | 100 | — | — |
| PAC 5-2 | — | — | 100 | — |
| PAC 5-3 | — | — | — | 100 |
| Demin. Water | 98.0 | 93.6 | 106.1 | 203.3 |

-continued

|  | Example Nr. | | | |
|---|---|---|---|---|
|  | C 6-1 | C 6-2 | C 6-3 | C 6-4 |
| DNE 01 (as supplied) | 0.6 | 0.8 | 0.8 | 1.1 |
| BYK 348 (as supplied) | 1.1 | 1.6 | 1.5 | 2.1 |
| Tegowet KL 245 (50% in water) | 0.8 | 1.2 | 1.1 | 1.6 |
| Aquacer 535 (as supplied) | 4.1 | 6.0 | 5.6 | 5.6 |
| Sillitin Z 86 | 13.8 | 20.3 | 19.1 | 26.3 |
| Talkum IT extra | 11.0 | 16.2 | 15.3 | 21.0 |
| Bayferrox 318 M | 36.8 | 54.1 | 50.9 | 70.1 |
| OK 412 (added afterwards under dissolver) | 7.4 | 10.8 | 10.2 | 14.0 |
| Bayhydur VP LS 2306 | 49.4 | 111.2 | 105.0 | 148.2 |

Example Group 7 haptic testing on Bayblend T65 as a substrate

| Coating | Binder | Haptics |
|---|---|---|
| C 6-1 | Bayhydrol PT 355 | 3 (strongly rubber-like, very strongly blocking) |
| C 6-2 | PAC 5-1 | 1 (velvety, soft) |
| C 6-3 | PAC 5-2 | 1 (velvety) |
| C 6-4 | PAC 5-3 | 1 (velvety, smooth, slightly rubber-like) |

Example Group 8 solvent resistance on glass

| Coating | Binder | EtOAc | MPA | Xylene | EtOH | SB | H$_2$O |
|---|---|---|---|---|---|---|---|
| C 6-1 | Bayhydrol PT 355 | 5 | 4 | 4 | 4 | 4 | 3 |
| C 6-2 | PAC 5-1 | 4 | 3 | 3 | 3 | 3 | 2 |
| C 6-3 | PAC 5-2 | 4 | 3 | 3 | 3 | 3 | 3 |
| C 6-4 | PAC 5-3 | 4 | 4 | 4 | 4 | 3 | 3 |

The invention claimed is:

1. An aqueous composition having soft-feel properties and comprising:
A) an aqueous polyurethane-polyurea dispersion wherein the polyurethane-polyurea consists of the following units:
   a1) 20 to 94.5% by weight polyols selected from the group consisting of
   linear polyester diols or polyester polyols made from acids or anhydrides selected from the group consisting of adipic, decanedicarboxylic, terephthalic, isophthalic, o-phthalic, tetrahydrophthalic, hexahydrophthalic and acid anhydrides, and alcohols selected from the group consisting of ethanediol, di-, tri-, tetraethylene glycol, 1,2-propanediol, di-, tri-, tetrapropylene glycol, butane-1,4-diol, hexane-1,6-diol, 2,2-dimethyl-1,3-propanediol, 1,4-dimethylolcyclohexane and mixtures thereof, with or without the use of polyols of higher functionality;
   copolymers of hexane-1,6-diol, ε-caprolactone with diphenyl and/or dialkyl carbonates; and
   hydroxyl-containing polycarbonates prepared by reacting diols selected from the group consisting of 1,4-butanediol, 1,6-hexanediol, and mixtures thereof, with diaryl carbonates;
   a2) 0 to 30% by weight diols selected from the group consisting of 1,2-ethanediol, 1,4-butanediol, 1,6-hexanediol, 2,2-dimethylpropane-1,3-diol, and mixtures thereof;
   a3) 0 to 10% by weight nonionic hydrophilicizer based on a copolymer of ethylene oxide and propylene oxide;
   a4) 4.5 to 50% by weight di- or polyisocyanates selected from the group consisting of 1,6-diisocyanatohexane, 1-isocyanato-3,3,5-trimethyl-5-isocyanatomethylcyclohexane (isophorone diisocyanate), 4,4'-diisocyanatodicyclohexylmethane, 1-isocyanato-1-methyl-4(3)isocyanatomethylcyclohexane, 1,3- and 1,4-bis(2-isocyanatoprop-2-yl)benzene, and mixtures thereof;
   a5) 0.5 to 13% by weight aliphatic and/or alicyclic primary and/or secondary polyamines selected from the group consisting of 1,2-ethanediamine, 1-amino-3,3,5-trimethyl-5-aminomethylcyclohexane (isophoronediamine), piperazine, diethylenetriamine, hydrazine, hydrazine hydrate, and mixtures thereof; and
   a6) 0.5 to 8% by weight diamines or polyamines containing alkali metal salts of N-(2-aminoethyl)-2-aminoethanesulphonic acid;
B) a hydroxy-functional polyacrylate copolymer dispersion prepared from 2-ethyl hexyl acrylate, hydroxypropyl methacrylate, hydroxyethyl acrylate, butyl acrylate, butyl methacrylate, isobornyl methacrylate, styrene, methyl methacrylate, acrylic acid or mixtures thereof, and
C) a polyisocyanate, which is optionally hydrophilically modified,
wherein the copolymer dispersion B) further comprises a hydroxy-functional polycarbonate diol D) as a reactive diluent,
wherein the composition has a haptic testing result of 1.

2. The composition according to claim 1, wherein the hydroxy-functional polycarbonate polyol D) has an average hydroxyl functionality of ≥1.6 to ≤6 and a number average molecular weight of ≥240 g/mol to ≤5000 g/mol.

3. The composition according to claim 1, wherein the hydroxy-functional polycarbonate polyol D) is prepared from 1,4-butane diol, 1,6-hexane diol, 3-methyl-1,5-pentane diol or mixtures thereof.

4. The composition according to claim 1, wherein the hydroxy-functional polycarbonate polyol D) is prepared from 1,6-hexane diol and ε-caprolactone.

5. The composition according to claim 1, wherein the hydroxy-functional polycarbonate polyol D) has an average hydroxyl functionality of ≥1.9 to ≤2.05.

6. The composition according to claim 1, wherein the polycarbonate polyol D) is present in an amount of ≥40 weight-% to ≤80 weight-% with respect to the solid content of the copolymer dispersion B).

7. The composition according to claim 1, wherein the polyisocyanate C) comprises hexamethylene diisocyanate.

8. The aqueous composition according to claim 1, wherein the polyisocyanate C) is hydrophilically modified.

9. A process for producing coatings which comprises applying a coating composition comprising the composition of claim 1 to a substrate and subsequently curing the coating composition to form a coating.

10. A substrate coated with the composition of claim 1.

11. The coated substrate of claim 10, wherein the substrate is a flexible and/or stretchable substrate made of thermoplastic and/or thermoset polymers.

12. A process for the production of soft-feel coatings comprising applying a coating composition comprising the composition of claim 1 to a substrate and subsequently curing the coating composition to form a coating.

13. The process according to claim 12, wherein the soft-feel coatings are automobile interior coatings.

* * * * *